US010716653B2

(12) United States Patent
Lee et al.

(10) Patent No.: US 10,716,653 B2
(45) Date of Patent: Jul. 21, 2020

(54) INHALATION TOXICITY TESTING CHAMBER DEVICE FOR NANOPARTICLES HAVING MULTIPLE CONCENTRATIONS

(71) Applicants: HYUNDAI CALIBRATION & CERTIFICATION TECHNOLOGIES CO., LTD., Icheon-si, Gyeonggi-do (KR); KOREA RESEARCH INSTITUTE OF CHEMICAL TECHNOLOGY, Daejeon (KR)

(72) Inventors: Kyu Hong Lee, Jeongeup-si (KR); Yong Taek Kwon, Icheon-si (KR); Ki Soo Jeon, Yongin-si (KR); Jae Seong Lee, Seoul (KR); Ki Won Seo, Suwon-si (KR); Ji Hyun Han, Yeoju-si (KR)

(73) Assignees: HYUNDAI CALIBRATION & CERTIFICATION TECHNOLOGIES CO., LTD., Icheon-si, Gyeonggi-Do (KR); KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 493 days.

(21) Appl. No.: 15/538,891

(22) PCT Filed: Jan. 7, 2015

(86) PCT No.: PCT/KR2015/000151
§ 371 (c)(1),
(2) Date: Jun. 22, 2017

(87) PCT Pub. No.: WO2016/104859
PCT Pub. Date: Jun. 30, 2016

(65) Prior Publication Data
US 2017/0367805 A1    Dec. 28, 2017

(30) Foreign Application Priority Data
Dec. 23, 2014  (KR) .......................... 10-2014-0187435

(51) Int. Cl.
*A61D 7/04*        (2006.01)
*G01N 35/10*       (2006.01)
(Continued)

(52) U.S. Cl.
CPC .................. *A61D 7/04* (2013.01); *A01K 1/04* (2013.01); *G01N 35/00* (2013.01); *G01N 35/10* (2013.01)

(58) Field of Classification Search
CPC ............... A61D 7/00; A61D 7/04; A01K 1/04
See application file for complete search history.

(56) References Cited

U.S. PATENT DOCUMENTS 5,112,270 A * 5/1992 Howard .................... A22B 3/02
                                                       452/57
5,297,502 A    3/1994 Jaeger
(Continued)

FOREIGN PATENT DOCUMENTS

CN    102788868 A    11/2012
CN    103340699 A    10/2013
(Continued)

OTHER PUBLICATIONS

Translation of applicant submitted foreign reference KR 10-1463908, Nov. 2014.*
(Continued)

*Primary Examiner* — Monica L Barlow
*Assistant Examiner* — Aaron M Rodziwicz
(74) *Attorney, Agent, or Firm* — Birch, Stewart, Kolasch & Birch, LLP

(57) ABSTRACT

The present invention relates to an inhalation toxicity testing chamber device for nanoparticles having a plurality of concentrations. The present invention provides an inhalation toxicity testing chamber device for nanoparticles having a plurality of concentrations, which: can supply nanoparticles
(Continued)

having different concentrations to particle exposure modules by stacking a plurality of particle exposure modules inside a single chamber housing and by allowing each particle exposure module so as to form an independent space from each other; can perform inhalation toxicity testing of nanoparticles having a plurality of concentrations through a single chamber housing by being capable of exposing the test animals put into each particle exposure module to nanoparticles having different concentrations; can easily perform inhalation toxicity tests of nanoparticles in a small scale laboratory etc. by improving the overall space efficiency as well as reducing the test cost; and can easily perform more diverse and accurate inhalation toxicity tests on nanoparticles by selectively allowing a plurality of particle exposure modules to be in communication with each other or to be formed as an independent space, according to a user's needs, thereby variably applying the space of the particle exposure module without changing the arrangement of the particle exposure module.

6 Claims, 4 Drawing Sheets

(51) Int. Cl.
*G01N 35/00* (2006.01)
*A01K 1/04* (2006.01)

(56) References Cited

U.S. PATENT DOCUMENTS

| | | | | |
|---|---|---|---|---|
| 6,126,534 | A | * | 10/2000 | Jacobs .................... A22B 3/00 452/66 |
| 7,448,943 | B1 | * | 11/2008 | Woodford ............. A22B 3/005 452/66 |
| 8,323,080 | B2 | * | 12/2012 | Lang ..................... A22B 3/086 452/57 |
| 2008/0047554 | A1 | | 2/2008 | Roy et al. |

FOREIGN PATENT DOCUMENTS

| | | |
|---|---|---|
| CN | 203432980 U | 2/2014 |
| JP | 2006-288560 A | 10/2006 |
| KR | 10-0784763 B1 | 12/2007 |
| KR | 10-1017402 B1 | 2/2011 |
| KR | 10-1221106 B1 | 1/2013 |
| KR | 10-1463908 B1 | 11/2014 |

OTHER PUBLICATIONS

Translation of applicant submitted foreign reference KR 10-0784763, Dec. 2007.*

* cited by examiner

[FIG. 1]
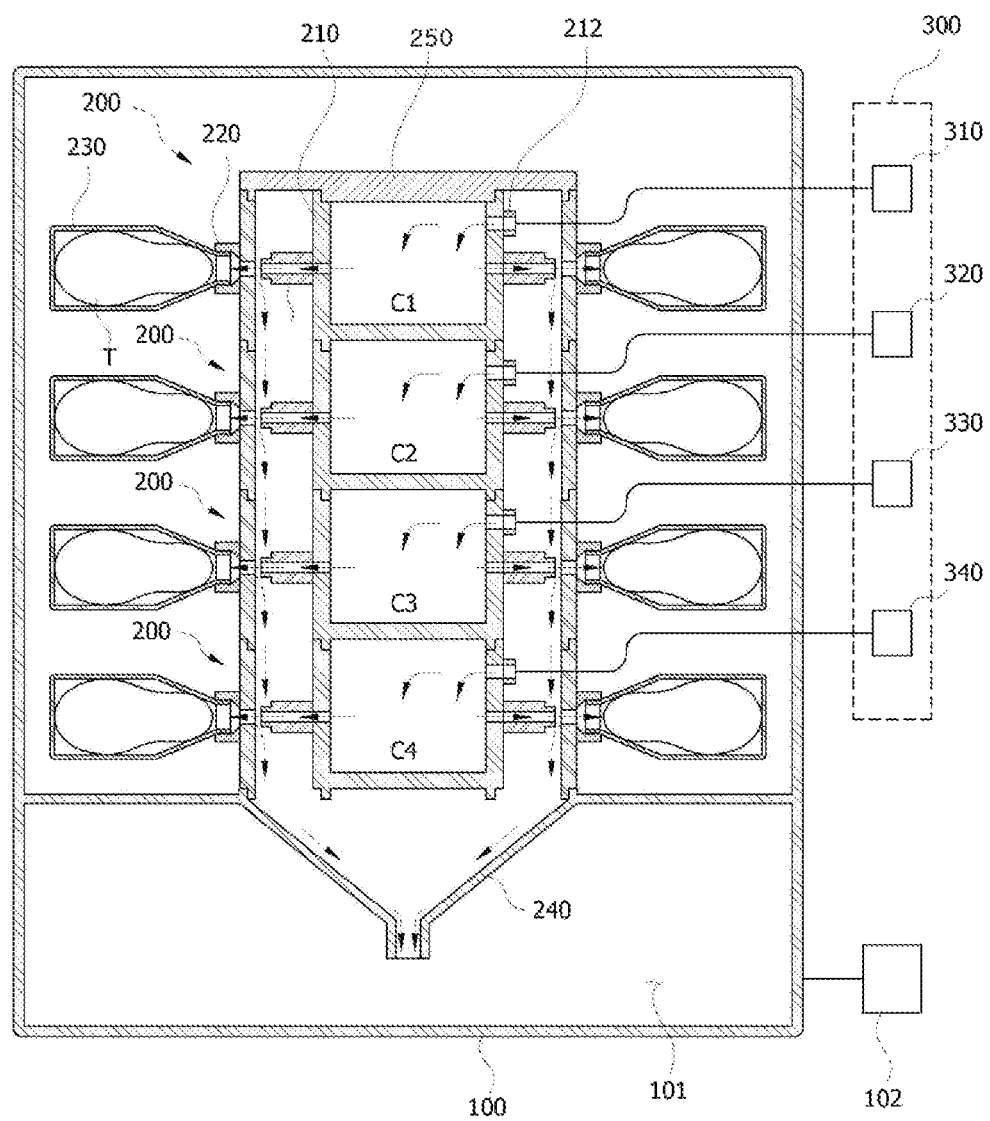

【FIG. 2】
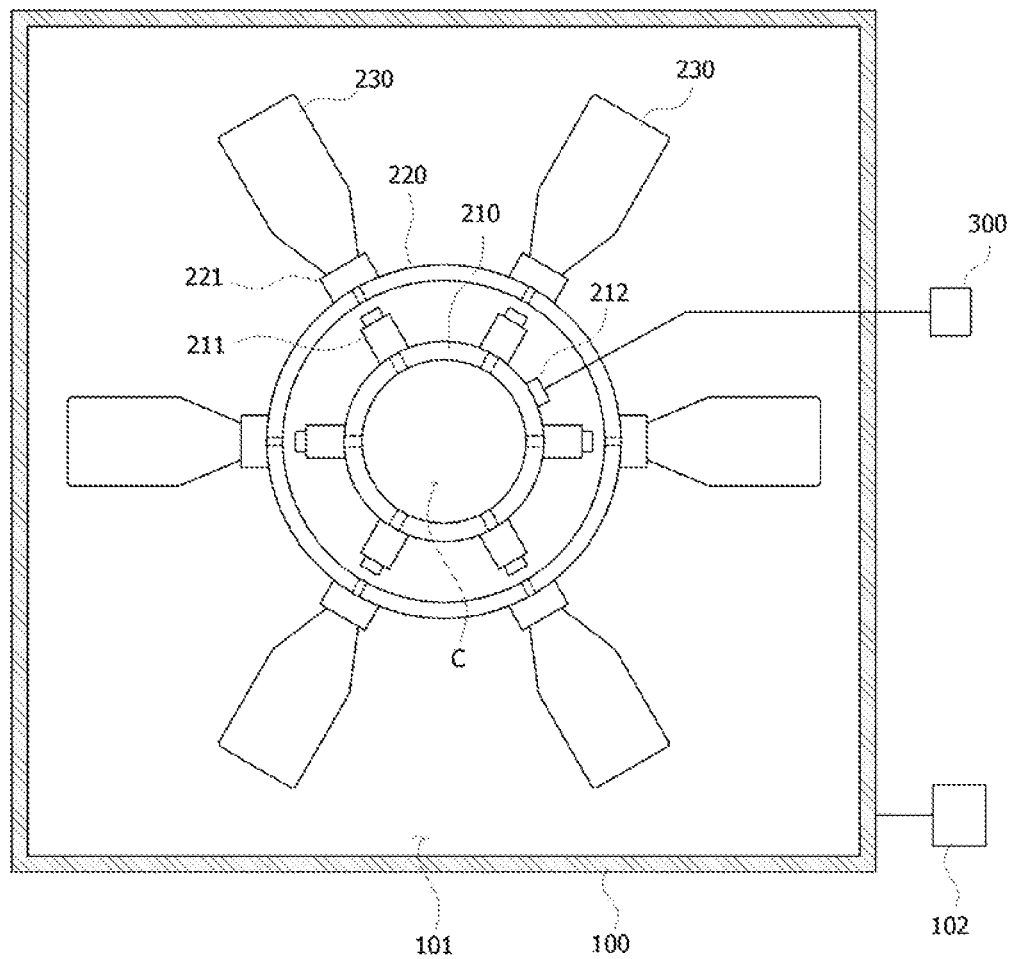
【FIG. 3】
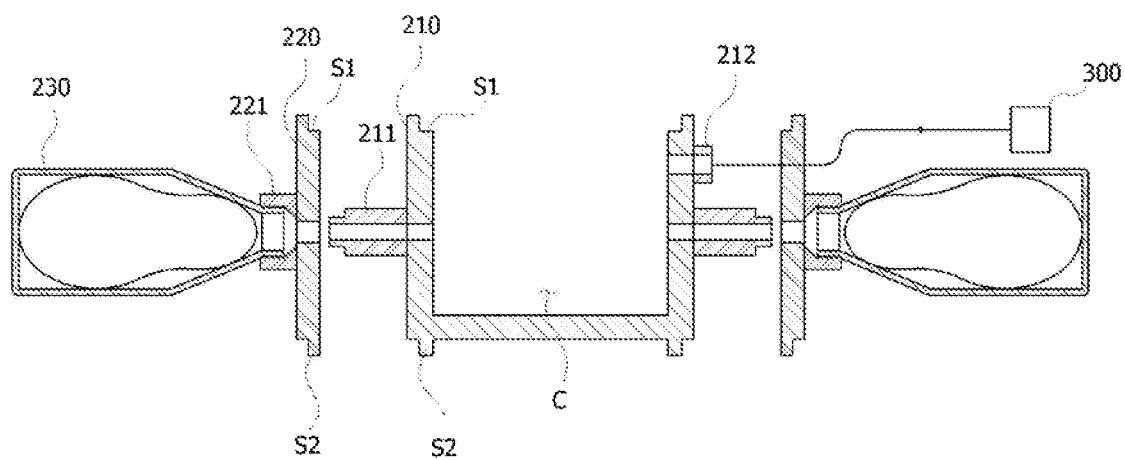

[FIG. 4]
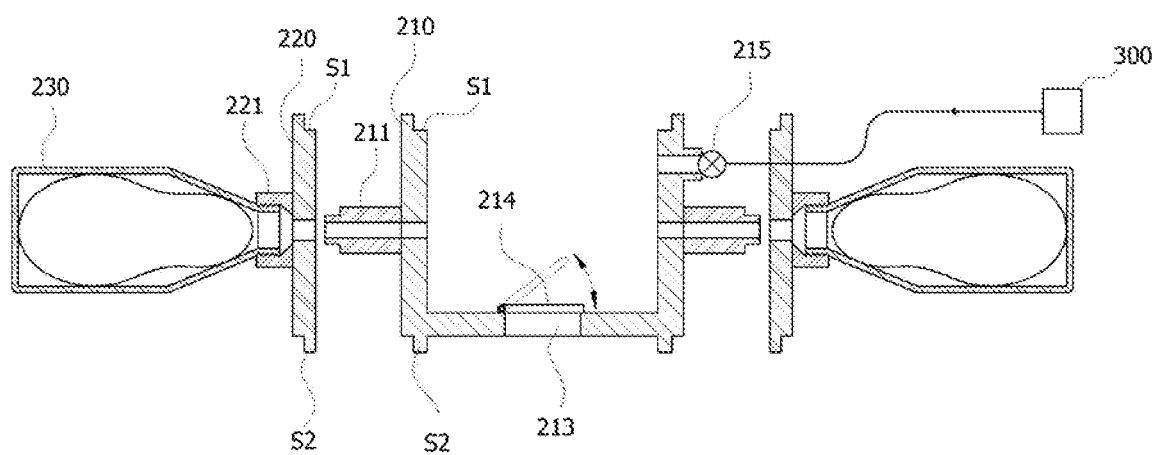

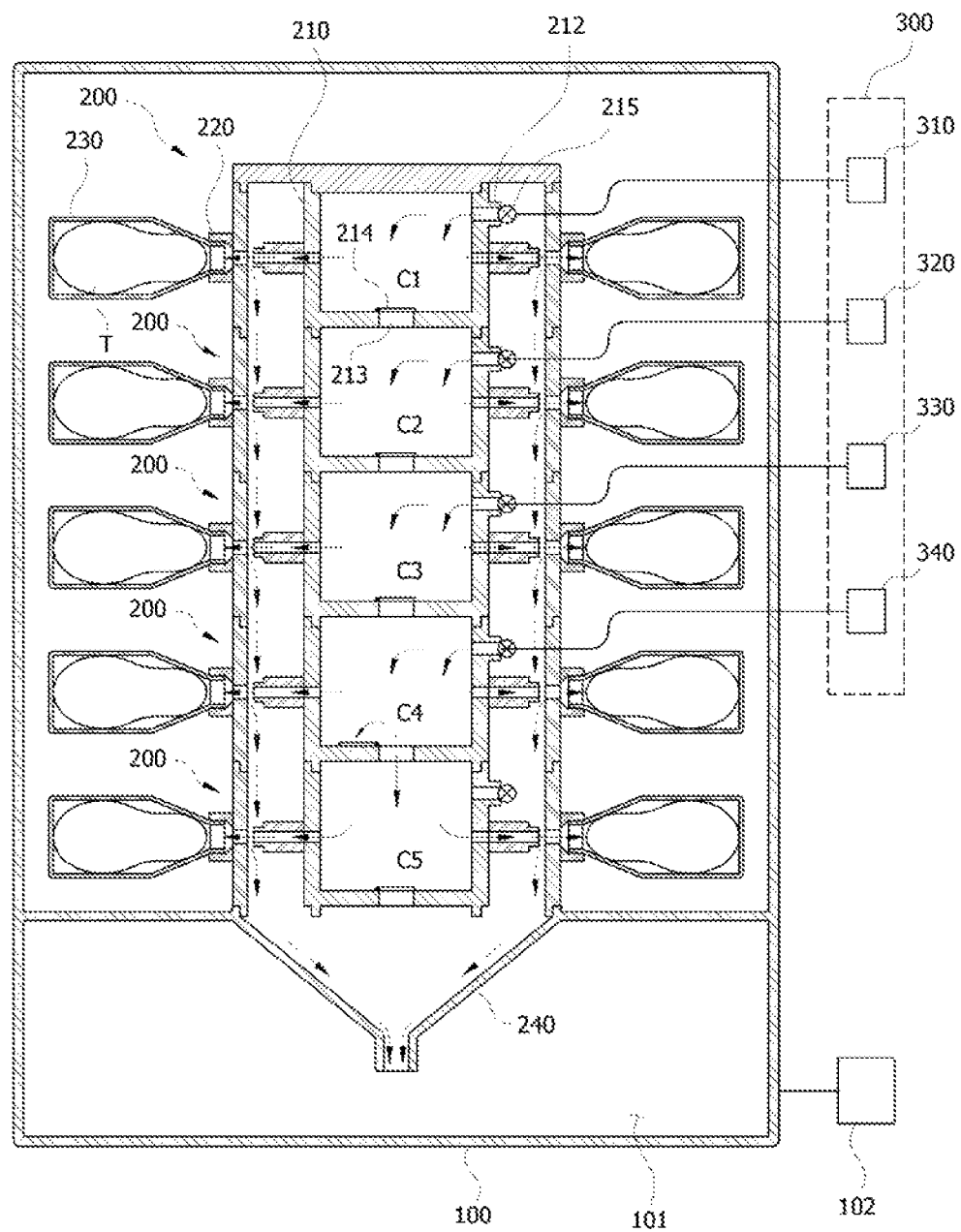
[FIG. 5]

INHALATION TOXICITY TESTING CHAMBER DEVICE FOR NANOPARTICLES HAVING MULTIPLE CONCENTRATIONS

CROSS REFERENCE TO RELATED APPLICATIONS

This application is the National Phase of PCT International Application No. PCT/KR2015/000151, filed on Jan. 7, 2015, which claims priority under 35 U.S.C. 119(a) to Patent Application No. 10-2014-0187435, filed in Republic of Korea on Dec. 23, 2014, all of which are hereby expressly incorporated by reference into the present application.

TECHNICAL FIELD

The present disclosure relates to an inhalation toxicity testing chamber device for nanoparticles having a plurality of concentration levels. More particularly, the inhalation toxicity testing chamber device for nanoparticles having a plurality of concentration levels according to the present disclosure includes a plurality of particle exposure modules stacked on one another inside a single chamber housing to form spaces independent of each other, such that nanoparticles having different concentration levels can be supplied to the particle exposure modules. The inhalation toxicity testing chamber device allows inhalation toxicity testing of nanoparticles to be conducted in a plurality of concentration levels using a single chamber housing by exposing laboratory animals confined in respective particle exposure modules to different concentration levels of nanoparticles, improves overall space efficiency while reducing test costs such that inhalation toxicity testing of nanoparticles can be conducted in a small scale laboratory or the like, and allows the spaces of the particle exposure modules to communicate with each other or remain independent of each other as required by a user, such that the spaces of the particle exposure modules are variably applicable without changing the arrangement of the particle exposure modules, thereby allowing more diverse and accurate inhalation toxicity testing of nanoparticles to be conducted.

BACKGROUND ART

The 21$^{st}$ century may be referred to as the nano-era, while the 20$^{th}$ century is represented by microtechnology. Nanotechnology may generally be categorized as comprising nanomaterials, nanodevices, as well as environmental and biotechnological technologies, according to applications thereof.

Nanotechnology is the artificial manipulation of ultrafine matter on the atomic or molecular scale to form or fabricate materials or devices having new properties and functions. At present, nanotechnology is regarded as a key cutting-edge technology for in the areas of both information technology (IT) and biotechnology (BT).

Nanotechnology provides a range of advantages and merits throughout industrial fields, such that some may speak of another technological revolution occurring. However, it is regarded that nanotechnology has potential dangers that may originate from the characteristics of nanotechnology.

Since smaller particles have greater specific surface areas, fine particles having such increased specific surface areas are increased in toxicity when reacting with biotissues. For example, as demonstrated in previous academic experiments, the toxicity of specific nanoparticles, such as titanium dioxide, carbon powder, and diesel particles, for example, increases with decreases in the sizes thereof, thereby causing inflammation. In addition, ultrafine nanoparticles may be deeply lodged in lung cells or move to the brain without being filtered by the respiratory tract or mucosa. Moreover, according to a plurality of recent studies, it has been theorized that there may be links between nanoparticles accumulated in the human body and diseases or disorders of the central nervous system.

Recently, with the development of nanotechnology, stability evaluation of nanotechnology has also been actively conducted. As a representative method of evaluating toxicity generated when nanoparticles are inhaled and accumulated in the human body, inhalation toxicity testing of nanoparticles has been undertaken with various laboratory animals. Data relating to nanoparticle harmfulness to the human body acquired through inhalation toxicity testing of nanoparticles is used as base data relating to nanoparticles in the manufacturing of products such as nanofibers, cosmetics, semiconductors, and drug carriers across a range of industrial fields.

Recently, as the importance of nanotechnology has come to prominence, not only inhalation toxicity testing of nanoparticles, but also various other experiments, such as effectiveness testing on nanoparticles with respect to the human body, stability testing on nanoparticles, and environmental effect evaluation of nanoparticles, have been conducted. A variety of experiments are conducted substantially in the same manner as inhalation toxicity testing, since all of such experiments evaluate effects of nanoparticles on the human body. Thus, hereinafter, a variety of experiments on nanoparticles will collectively be referred to as inhalation toxicity testing.

In addition, nanoparticles are aerosol particles, and testing of nanoparticles may be equally applied to testing of aerosol particles having submicron diameters. Thus, hereinafter, the term "nanoparticles" used herein will be interpreted as including the concept of submicron particles, unless otherwise specified.

Inhalation toxicity testing of nanoparticles as described above is typically conducted by supplying an aerosol of nanoparticles into an exposure chamber having a predetermined size, exposing a laboratory animal inserted into the exposure chamber to the nanoparticles, and then measuring a variety of changes in the laboratory animal. More specifically, a hollow pipe having the shape of a vertical tower is disposed within a single chamber housing, a plurality of laboratory animal restraining units, into each of which a laboratory animal is inserted, are fitted to the hollow pipe to communicate with the hollow pipe, and a separate particle supply unit is connected to the vertical tower-shaped hollow pipe, such that nanoparticles produced by the particle supply unit are supplied to the laboratory animals confined in the laboratory animal restraining units.

Nanoparticles must be supplied in different concentration levels to the laboratory animal restraining units to obtain more diverse and accurate testing results on the effects of nanoparticles. In this regard, a method of preparing a plurality of chamber housings as described above and supplying nanoparticles having different concentration levels to the hollow pipes and the laboratory animal restraining units disposed within the chamber housings is generally used.

According to this method, a large scale and expensive operating costs are required for an inhalation toxicity testing device for nanoparticles, since a plurality of chamber housings for supplying nanoparticles in different concentration levels, as well as air circulating equipment, must be provided. Thus, such inhalation toxicity testing of nanoparticles having different concentration levels has been conducted in professional research institutes and testing agencies but cannot be conducted in small laboratories, such as university laboratories. In particular, even in the case in which inhalation toxicity testing is to be conducted in a small scale and in a relatively simple manner, a plurality of chamber housings must be provided in a considerable scale, thereby leading to degraded space efficiency and increased testing costs, which are problematic. It is also difficult to conduct testing in more various manners as required by the user.

DISCLOSURE

Technical Problem

Accordingly, the present disclosure has been made in consideration of the above-described problems occurring in the related art, and the present disclosure provides an inhalation toxicity testing chamber device for nanoparticles having a plurality of concentration levels. The inhalation toxicity testing chamber device includes a plurality of particle exposure modules stacked on one another inside a single chamber housing, the particle exposure modules being configured to form spaces independent of each other, such that nanoparticles having different concentration levels can be supplied to the particle exposure modules. The inhalation toxicity testing chamber device allows inhalation toxicity testing of nanoparticles to be conducted in a plurality of concentration levels using a single chamber housing by exposing laboratory animals confined in respective particle exposure modules to different concentration levels of nanoparticles. In addition, overall space efficiency is improved while test costs are reduced such that inhalation toxicity testing of nanoparticles can be conducted in a small scale laboratory or the like.

Also provided is an inhalation toxicity testing chamber device for nanoparticles having a plurality of concentration levels, the inhalation toxicity testing chamber device allowing the spaces of the particle exposure modules to communicate with each other or remain independent of each other as required by a user, such that the spaces of the particle exposure modules are variably applicable without changing the arrangement of the particle exposure modules, thereby allowing more diverse and accurate inhalation toxicity testing of nanoparticles to be conducted.

Technical Solution

According to an aspect of the present disclosure, provided is an inhalation toxicity testing chamber device for nanoparticles. The inhalation toxicity testing chamber device may include: a chamber housing; and a plurality of particle exposure modules disposed within the chamber housing and stacked on one another, the plurality of particle exposure modules being connected to separate particle supply units that supply nanoparticles to the plurality of particle exposure modules, each of the plurality of particle exposure modules including a particle exposure module in an inner space thereof, wherein a laboratory animal is inserted into the particle exposure module to be exposed to nanoparticles. The plurality of particle exposure modules are provided independent of each other such that nanoparticles supplied to one particle exposure module of the plurality of particle exposure modules by the particle supply units have a different concentration level from nanoparticles supplied to the other particle exposure modules, thereby enabling inhalation toxicity testing of nanoparticles to be simultaneously conducted in a plurality of concentration levels.

Each of the plurality of particle exposure modules may include: an inner casing having a shape of a hollow pipe, with a top end thereof being open and a bottom end thereof being closed, the inner casing including a particle supply port in one portion, allowing nanoparticles to be supplied by a corresponding one of the particle supply units, and particle flow ports in other portions, allowing particles to flow outwards; an outer casing having a shape of a hollow pipe surrounding the inner casing, with both top and bottom ends thereof being open, the outer casing including connector ports in positions corresponding to the particle flow ports of the inner casing; and laboratory animal restraining units respectively having an inner space into which a laboratory animal is inserted, the laboratory animal restraining units being fitted to the connector ports such that nanoparticles flowing outwards through the particle flow ports enter the inner spaces thereof through the connector ports.

The inner casings of the plurality of particle exposure modules may be configured to be fitted to and stacked atop one another. The outer casings of the plurality of particle exposure modules may be configured to be fitted to and stacked atop one another.

In a position in which the plurality of particle exposure modules are stacked atop one another, the top ends of the inner and outer casings of the top particle exposure module among the plurality of particle exposure modules may be closed using a separate casing cover.

The inner casing may include a communication hole door for opening and closing a communication hole in a bottom thereof, such that inner spaces of the inner casings of the plurality of particle exposure modules stacked atop one another communicate with each other through the communication holes.

In addition, an opening and closing valve may be disposed on the particle supply port of the inner casing to open and close the particle supply port.

Advantageous Effects

According to the present disclosure, a plurality of particle exposure modules are stacked on one another inside a single chamber housing, the particle exposure modules being configured to form spaces independent of each other, such that nanoparticles having different concentration levels can be supplied to the particle exposure modules. Inhalation toxicity testing of nanoparticles can be conducted in a plurality of concentration levels using a single chamber housing by exposing laboratory animals confined in respective particle exposure modules to different concentration levels of nanoparticles. In addition, overall space efficiency is improved while test costs are reduced such that inhalation toxicity testing of nanoparticles can be conducted in a small scale laboratory or the like.

In addition, according to the present disclosure, the spaces of the particle exposure modules can communicate with each other or remain independent of each other as required by a user, such that the spaces of the particle exposure modules are variably applicable without changing the arrangement of the particle exposure modules, thereby allowing more diverse and accurate inhalation toxicity testing of nanoparticles to be conducted.

DESCRIPTION OF DRAWINGS

FIG. 1 is a cross-sectional view schematically illustrating the configuration of an inhalation toxicity testing chamber device for nanoparticles according to an exemplary embodiment;

FIG. 2 is a plan view schematically illustrating the configuration of the inhalation toxicity testing chamber device for nanoparticles according to the exemplary embodiment;

FIG. 3 is a cross-sectional view schematically illustrating one configuration of the particle exposure module according to the exemplary embodiment;

FIG. 4 is a cross-sectional view schematically illustrating the configuration of a particle exposure module according to another exemplary embodiment; and FIG. 5 is an exemplary view illustrating an application mode of an inhalation toxicity testing chamber device for nanoparticles in which the particle exposure modules, as illustrated in FIG. 4, are used.

MODE FOR INVENTION

Hereinafter, reference will be made to the present disclosure in detail, examples of which are illustrated in the accompanying drawings. Throughout this document, reference should be made to the drawings, in which the same reference numerals and symbols will be used to designate the same or like components. In the following description, detailed descriptions of known functions and components incorporated herein will be omitted in the case that the subject matter of the present disclosure may be rendered unclear thereby.

FIG. 1 is a cross-sectional view schematically illustrating the configuration of an inhalation toxicity testing chamber device for nanoparticles according to an exemplary embodiment, FIG. 2 is a plan view schematically illustrating the configuration of the inhalation toxicity testing chamber device for nanoparticles according to the exemplary embodiment, and FIG. 3 is a cross-sectional view schematically illustrating one configuration of the particle exposure module according to the exemplary embodiment.

The inhalation toxicity testing chamber device for nanoparticles according to the exemplary embodiment includes a chamber housing 100 and a plurality of particle exposure modules 200 disposed in the inner space of the chamber housing 100.

The chamber housing 100 is configured to enclose the particle exposure modules 200. The inner space 101 is connected to a separate intake pump 102 such that negative pressure can be formed in the inner space 101.

Each of the particle exposure modules 200 has an exposure chamber C in the inner space thereof. The particle exposure modules 200 are connected to separate particle supply units 300, such that nanoparticles are supplied to the exposure chambers C. A laboratory animal T is inserted into each exposure chamber C to be exposed to nanoparticles supplied to the exposure chamber C. The particle exposure module 200 may include an inner casing 210, an outer casing 220, and laboratory animal restraining units 230, which will be described in detail later.

A plurality of such particle exposure modules 200 are provided such that the particle exposure modules 200 are stacked on one another within the chamber housing 100. The particle exposure modules 200 are provided independent of each other, such that nanoparticles having different concentration levels are supplied thereto by the particle supply units 300.

Specifically, when nanoparticles having different concentration levels are supplied to the particle exposure modules 200 by the particle supply units 300, the particle exposure modules 200 provided independent of each other prevent nanoparticles in one module from mixing with nanoparticles in the other module, so that the particle exposure modules 200 maintain the different nanoparticle concentration levels.

According to this configuration, nanoparticles having different concentration levels can be supplied to the plurality of particle exposure modules 200 disposed within the chamber housing 100, allowing inhalation toxicity testing of nanoparticles to be conducted in a plurality of concentration levels in a single chamber housing 100. Since a plurality of chamber housings 100 are not required, the device can have a smaller size, space efficiency can be improved, and test costs can be reduced.

Described in more detail, each of the particle exposure modules 200 may include the inner casing 210, the outer casing 220, and the laboratory animal restraining units 230.

The inner casing 210 has the shape of a hollow pipe, with the top end being open and the bottom end being closed. The inner casing 210 has a particle supply port 212 in one portion, through which nanoparticles can be supplied by the particle supply unit 300, and a plurality of particle flow ports 211 in the other portions, through which particles can flow outwards. As illustrated in FIG. 2, a single particle supply port 212 is provided in one portion of the inner casing 210, while the plurality of particle flow ports 211 may be disposed at predetermined distances from each other, along the circumference of the inner casing 211.

The outer casing 220 has the shape of a hollow pipe surrounding the inner casing 210, with both the top end and the bottom end being open. The outer casing 220 has a plurality of connector ports 221 in positions corresponding to the plurality of particle flow ports 211 of the inner casing 210. When the plurality of particle flow ports 211 are disposed at predetermined distances along the circumference of the inner casing 210, the plurality of connector ports 221 are disposed along the circumference of the outer casing 220 in a corresponding manner. The connector ports 221 are provided in positions corresponding to the particle flow ports 211, respectively.

The inner casings 210 are configured to be fitted to and stacked atop one another, and the outer casings 220 are configured to be fitted to and stacked atop one another. In this regard, each of the inner and outer casings 210 and 220 may have a stepped portion S1 formed in the top portion and a protrusion S2 formed on the bottom portion to be fitted to the stepped portion S1.

The laboratory animal restraining units 230 are configured such that laboratory animals T are inserted into the inner spaces thereof. The laboratory animal restraining units 230 are fitted to the connector ports 221, respectively, allowing nanoparticles flowing outwards through the particle flow ports 211 to enter the inner spaces thereof through the connector ports 221.

The plurality of particle exposure modules 200 are stacked on one another within the chamber housing 100, with the inner casings 210 and the outer casings 220 being stacked atop one another, i.e. stacked on one another in the vertical direction. The top particle exposure module 200 may be configured such that the top ends of the inner and outer casings 210 and 220 thereof are closed using a separate casing cover 250.

When the particle exposure modules 200 are stacked atop one another, the inner space of the inner casing 210 of one particle exposure module 200 is defined to be independent of the adjacent particle exposure module(s) 200. The inner space of the inner casing 210 communicates with the laboratory animal restraining units 230 through the particle flow ports 211 and the connector ports 221. That is, the inner space of the inner casing 210 is the space to which nanoparticles are supplied by the corresponding particle supply unit 300 and from which the nanoparticles are supplied to the laboratory animal restraining units 230 through the particle flow ports 211 and the connector ports 221. Thus, the inner space of the inner casing 210 and the laboratory animal restraining units 230 form a single exposure chamber C in which laboratory animals T are exposed to nanoparticles.

In this case, in the plurality of particle exposure modules 200, the inner spaces of the inner casings 210 form independent spaces, respectively. Thus, the exposure chambers C form independent spaces that are isolated from each other, such that nanoparticles having different concentration levels can be supplied to the independent spaces.

As illustrated in FIG. 1, when four particle exposure modules 200 are stacked on one another, exposure chambers C1, C2, C3, and C4 are sequentially defined in the top to bottom direction, and nanoparticles having different concentration levels can be supplied to the exposure chambers C1, C2, C3, and C4 by the separate particle supply units 300 (310, 320, 330, and 340), respectively. The nanoparticles, supplied to each inner space of the inner casings 210, are supplied to the corresponding laboratory animal restraining units 230 through the corresponding particle flow ports 211 and the corresponding connector ports 221, such that the laboratory animals T confined in the laboratory animal restraining units 230 are exposed to the nanoparticles.

Since the laboratory animals T, confined in the laboratory animal restraining units 230 of the particle exposure modules 200, are exposed to the nanoparticles having different concentration levels, inhalation toxicity testing of nanoparticles can be conducted in a plurality of concentration levels using the single chamber housing 100.

The flow of nanoparticles will be described in more detail as follows: Nanoparticles having different concentration levels are supplied to the inner casings 210 of the particle exposure modules 200 by the separate particle supply units 300 (310, 320, 330, and 340), respectively. Here, nanoparticles are supplied to each of the inner casing 210 through the corresponding particle supply port 212. The nanoparticles, supplied to the inner casing 210, are introduced into the laboratory animal restraining units 230 through the particle flow ports 211 and the connector ports 221 and then are exposed to the laboratory animals T.

The laboratory animals T, confined in the laboratory animal restraining units 230, inhale the nanoparticles through respiration. To obtain accurate testing results, exhalations from the laboratory animals T may be discharged from the laboratory animal restraining units 230. Thus, the laboratory animal restraining units 230 fitted to the connector ports 221 of the outer casing 220 may be spaced apart from the particle flow ports 211 of the inner casing 210 by predetermined gaps, such that exhalations from the laboratory animals T are discharged from the laboratory animal restraining units 230 through the gaps.

As indicated by dotted arrows in FIG. 1, the exhalations from the laboratory animals T are discharged to the inner space of the outer casing 220 through the connector ports 221. Since the outer casing 220 is configured such that the top and bottom ends are open, a plurality of outer casings 220 stacked on one another communicate with each other without being defined into independent spaces. Thus, the exhalations of the laboratory animals T, discharged from the laboratory animal restraining units 230 of the particle exposure modules 200, are discharged to the inner spaces of the outer casings 220 and then to the inner space of the chamber housing 100. The chamber housing 100 has a guide port 240 supporting the plurality of particle exposure modules 200. The guide port 240 guides the exhalations of the laboratory animals T to be efficiently discharged from the outer casings 220. The guide port 240 may be fitted to the bottom particle exposure module 200. In addition, as described above, negative pressure is formed in the inner space of the chamber housing 100. The exhalations of the laboratory animals T can be more efficiently discharged to the inner space of the chamber housing 100 through the guide port 240.

According to the above-described configuration, the particle exposure modules 200 are configured such that the exposure chambers C, into which the laboratory animals are inserted, are provided independent of each other, such that nanoparticles having different concentration levels can be supplied to the exposure chambers C. It is thereby possible to conduct inhalation toxicity testing of nanoparticles in a plurality of concentration levels. In addition, all of the exhalations of the laboratory animals T are discharged to the inner space of the chamber housing 100 through the communicating spaces of the particle exposure modules 200, thereby allowing inhalation toxicity testing of nanoparticles to be conducted more accurately.

In particular, as illustrated in FIG. 1, when the particle exposure modules 200 are stacked on one another in four stories, nanoparticles having a standard concentration level are supplied to the exposure chamber C1 of the top particle exposure module 200, while nanoparticles having low, medium, and high concentration levels are supplied to the exposure chambers C2, C3, and C4 of the remaining particle exposure modules 200, which are sequentially disposed below the top particle exposure module. Here, the standard concentration level refers to a standard to be compared. According to this configuration, the effects of nanoparticles on laboratory animals T according to different concentration levels can be examined from more diverse viewpoints.

FIG. 4 is a cross-sectional view schematically illustrating the configuration of a particle exposure module according to another exemplary embodiment, and FIG. 5 is an exemplary view illustrating an application mode of the inhalation toxicity testing chamber device for nanoparticles in which the particle exposure module illustrated in FIG. 4 is used.

As illustrated in FIG. 4, in each of particle exposure modules 200 according to another exemplary embodiment, a communication hole 213 may be provided in the bottom of an inner casing 210, and a communication hole door 214 for opening and closing the communication hole 213 may be provided.

In addition, an opening and closing valve 215 may be disposed on a particle supply port 212 provided in the inner casing 210 to open and close the particle supply port 212.

According to this configuration, when the plurality of particle exposure modules 200 stacked atop one another, exposure chambers C defined within the inner casings 210 may be configured to communicate with each other or may be provided as independent spaces. In this case, it is possible to supply nanoparticles having the same concentration level to all of the exposure chamber C, which communicate with each other, through the particle supply port 212 of a single one of the inner casings 210, by manipulating the opening and closing valve 215 disposed on the particle supply port 212.

For example, as illustrated in FIG. 5, five particle exposure modules 200 may be stacked atop one another. In this case, for example, the communication hole door 214 between the exposure chambers C4 and C5 of the particle exposure modules 200, which are disposed on the second level and the bottom level, can be opened such that the exposure chambers C4 and C5 communicate with each other. As in the structure described with reference to FIG. 4, nanoparticles having a standard concentration level, i.e. a standard to be compared, can be supplied to the exposure chamber C1 of the top particle exposure module 200, nanoparticles having low and medium concentration levels can be supplied to the exposure chambers C2 and C3 of the particle exposure modules 200, which are sequentially disposed below the top particle exposure module, and nanoparticles having a high concentration level can be supplied to the exposure chambers C4 and C5, which are disposed on the second level and the bottom level. In this case, it is possible to simultaneously supply nanoparticles to the two exposure chambers C4 and Ct by closing the opening and closing valve 215 disposed on the particle supply port 212 of the bottom particle exposure module 200 and opening the opening and closing valve 215 disposed on the particle supply port 212 of the particle exposure module 200 on the second level.

As described above, in the inhalation toxicity testing chamber device for nanoparticles according to the exemplary embodiment, the communication hole doors 214 and the opening and closing doors 215 of the plurality of particle exposure modules 200 are selectively driven to open or close, so that specific particle exposure modules 200 communicate with each other or are isolated from each other. In this manner, nanoparticles having the same concentration level can be supplied to the communicating particle exposure modules 200.

Therefore, when the results of inhalation toxicity testing of high-concentration nanoparticles conducted with more population are required by a user, it is possible to operate the exposure chambers C4 and C5 to communicate with each other, as illustrated in FIG. 5. Then, more laboratory animal restraining units 230 can be connected to each other, and more various and accurate testing results can be obtained.

Differently from the exemplary configuration illustrated in FIG. 5, the height of the particle exposure modules 200 stacked on one another may be variously modified. A variety of modifications may be applied to the opening and closing of the communication hole doors 214 and the opening and closing doors 215 of the particle exposure modules 200. It is therefore possible to conduct various types of inhalation toxicity testing of nanoparticles having a plurality of concentration levels as required by the user.

The foregoing descriptions have been presented in order to illustrate the certain principles of the present disclosure. A person skilled in the art to which the disclosure relates could make many modifications and variations without departing from the principle of the disclosure. The foregoing embodiments disclosed herein shall be interpreted as illustrative only but not as limitative of the principle and scope of the disclosure. It should be understood that the scope of the disclosure shall be defined by the appended Claims and all of their equivalents fall within the scope of the disclosure.

The invention claimed is:

1. An inhalation toxicity testing chamber device for nanoparticles, comprising:
   a chamber housing; and
   a plurality of particle exposure modules disposed within the chamber housing, stacked on one another and abutting against one another, each of the plurality of particle exposure modules being connected to a respective particle supply unit via a respective particle support port that supplies nanoparticles to the respective particle exposure module, each of the plurality of particle exposure modules including an exposure chamber in an inner space thereof and an animal restraining unit spaced from the exposure chamber, wherein a laboratory animal is inserted into the animal restraining unit to be exposed to nanoparticles,
   wherein the plurality of particle exposure modules are provided independent of each other such that nanoparticles supplied to one particle exposure module of the plurality of particle exposure modules by the particle supply units have a different concentration level from nanoparticles supplied to the other particle exposure modules, thereby enabling inhalation toxicity testing of nanoparticles to be simultaneously conducted in a plurality of concentration levels.

2. The inhalation toxicity testing chamber device according to claim 1, wherein each of the plurality of particle exposure modules comprises:
   an inner casing having a shape of a hollow pipe, with a top end thereof being open and a bottom end thereof being closed, the inner casing comprising a particle supply port in one portion, allowing nanoparticles to be supplied by a corresponding one of the particle supply units, and particle flow ports in other portions, allowing particles to flow outwards, the particle supply port extending in a radial direction, wherein the inner casing defines the exposure chamber; and
   an outer casing having a shape of a hollow pipe surrounding the inner casing, with both top and bottom ends thereof being open, the outer casing comprising connector ports in positions corresponding to the particle flow ports of the inner casing, and
   wherein each laboratory animal restraining unit has an inner space into which the laboratory animal is inserted, the laboratory animal restraining units being fitted to the connector ports such that nanoparticles flowing outwards through the particle flow ports enter the inner spaces thereof through the connector ports.

3. The inhalation toxicity testing chamber device according to claim 2, wherein the inner casings of the plurality of particle exposure modules are configured to be fitted to and stacked atop one another, and the outer casings of the plurality of particle exposure modules are configured to be fitted to and stacked atop one another.

4. The inhalation toxicity testing chamber device according to claim 2, wherein, in a position in which the plurality of particle exposure modules is stacked atop one another, the top ends of the inner and outer casings of the top particle exposure module among the plurality of particle exposure modules are closed using a separate casing cover.

5. The inhalation toxicity testing chamber device according to claim 2, wherein the inner casing comprises a communication hole door for opening and closing a communication hole in a bottom thereof, such that inner spaces of the inner casings of the plurality of particle exposure modules stacked atop one another communicate with each other through the communication holes.

6. The inhalation toxicity testing chamber device according to claim 5, wherein an opening and closing valve is disposed on the particle supply port of the inner casing to open and close the particle supply port.

* * * * *